US010907286B2

(12) United States Patent
Feng

(10) Patent No.: US 10,907,286 B2
(45) Date of Patent: Feb. 2, 2021

(54) METHOD FOR APPLYING A PATTERN TO A PLUSH SYNTHETIC FABRIC USING A HOT PRESS TECHNIQUE

(71) Applicant: Chen Feng, City of Industry, CA (US)

(72) Inventor: Chen Feng, City of Industry, CA (US)

(73) Assignee: Sun-Yin USA Inc., City of Industry, CA (US)

( * ) Notice: Subject to any disclaimer, the term of this patent is extended or adjusted under 35 U.S.C. 154(b) by 425 days.

(21) Appl. No.: 15/886,774

(22) Filed: Feb. 1, 2018

(65) Prior Publication Data
US 2018/0216290 A1 Aug. 2, 2018

Related U.S. Application Data

(60) Provisional application No. 62/453,448, filed on Feb. 1, 2017, provisional application No. 62/465,634, filed on Mar. 1, 2017.

(51) Int. Cl.
D06C 15/12 (2006.01)
D06C 15/10 (2006.01)
D06C 23/04 (2006.01)
B29C 51/00 (2006.01)

(52) U.S. Cl.
CPC ............ D06C 15/12 (2013.01); D06C 15/10 (2013.01); D06C 23/04 (2013.01); D06C 2700/31 (2013.01)

(58) Field of Classification Search
CPC .... D06C 15/12; D06C 15/10; D06C 2700/31; D06C 2700/29; D06C 23/04; D06N 7/001; B29C 51/004; B29C 59/025; B32B 38/06; Y10T 156/1023

USPC ........................................................ 28/160
See application file for complete search history.

(56) References Cited

U.S. PATENT DOCUMENTS

| 1,699,288 A | * | 1/1929 | Frischer | ................. | D06C 15/10 101/3.1 |
| 1,825,727 A | * | 10/1931 | Hahn | ..................... | D06C 15/10 38/5 |
| 2,095,304 A | * | 10/1937 | Zinser | ..................... | B60R 13/02 428/161 |
| 2,296,408 A | * | 9/1942 | Todd | ..................... | D06N 7/001 156/79 |
| 2,700,205 A | * | 1/1955 | Rice | ....................... | D06C 29/00 28/160 |

(Continued)

FOREIGN PATENT DOCUMENTS

| FR | 1357846 A | * | 4/1964 | ............. D06C 23/00 |
| GB | 317578 A | * | 8/1929 | ............. D06C 23/00 |

Primary Examiner — Amy Vanatta
(74) Attorney, Agent, or Firm — Brian Beverly; Beeson Skinner Beverly, LLP

(57) ABSTRACT

A method based on a hot press technique is used to apply a permanent pattern onto a plush synthetic fabric having a pile. The method generally involves mounting one or more top plates and one or more bottom plates onto a hot press machine, where at least one of the top or bottom plates has a raised relief pattern on its surface. The temperature of the plates is set to at least 180° C. and the top and bottom plates are then pressed together against opposite sides of a plush synthetic fabric having a pile on at least one side, the raised relief pattern engaging the side of the fabric having the pile such that the pattern of the relief is imprinted into the pile.

14 Claims, 6 Drawing Sheets

(56) References Cited

U.S. PATENT DOCUMENTS

| | | | | |
|---|---|---|---|---|
| 3,868,214 A | * | 2/1975 | Shackleton | D06B 11/0076 8/471 |
| 3,997,946 A | * | 12/1976 | Hergert | D06C 23/04 26/2 R |
| 4,238,190 A | * | 12/1980 | Rejto | D06B 11/0076 156/219 |
| 4,255,150 A | * | 3/1981 | Fennekels | B41F 16/02 8/471 |
| 4,466,860 A | | 8/1984 | Aggio | |
| 5,167,133 A | | 12/1992 | Schmidt | |
| 7,229,680 B1 | * | 6/2007 | Crompton | B32B 38/06 428/88 |
| 9,181,646 B2 | | 11/2015 | Feng | |
| 2004/0038618 A1 | | 2/2004 | Atkins | |
| 2008/0026177 A1 | * | 1/2008 | Vollmert | D04H 1/559 428/95 |
| 2009/0047465 A1 | * | 2/2009 | Zafiroglu | B32B 3/28 428/97 |
| 2014/0013555 A1 | | 1/2014 | Feng | |

\* cited by examiner

METHOD FOR APPLYING A PATTERN TO A PLUSH SYNTHETIC FABRIC USING A HOT PRESS TECHNIQUE

CROSS-REFERENCE TO RELATED APPLICATIONS

This application claims the benefit of U.S. Provisional Application No. 62/453,448, filed Feb. 1, 2017, and U.S. Provisional Application No. 62/465,634, filed Mar. 1, 2017.

BACKGROUND

Field of the Invention

The present invention relates to the production of fabrics and in particular to a method for applying a pattern to a plush synthetic fabric using a hot press technique.

Discussion of Prior Art

A hot press technique has previously been employed with respect to the manufacturing of carpets and rubber products involving individual hot plates which are used to impose a pattern on the carpet or rubber product. This technique has never been applied to the production of fabrics, at least in part because the usual size of individual hot plates is not large enough to create a pattern on fabrics which are generally much wider than the hot plates. Creating permanent patterns on plush fabrics made of natural fibers is difficult because there is no practical way to remove the pile forming the pattern from the underlying yarns. Previous efforts to impose a pattern on plush fabrics made of natural fibers have proven to be impermanent, a common experience being that the pattern will fade away after the fabric is washed several times.

SUMMARY OF THE INVENTION

The present invention is directed to a method for applying a pattern to a plush synthetic fabric using a hot press technique. The method generally involves mounting one or more top plates and one or more bottom plates onto a hot press machine, where at least one of the top or bottom plates has a raised relief pattern on its surface. The temperature of the plates is set to at least 180° C. and the top and bottom plates are then pressed together against opposite sides of a plush synthetic fabric having a pile on at least one side. The raised relief pattern engages the side of the fabric having the pile such that the pattern of the relief is imprinted into the pile.

BRIEF DESCRIPTION OF THE ILLUSTRATIONS

DETAILED DESCRIPTION OF THE INVENTION

The present invention is directed to a method of patterning a plush synthetic fabric using a hot press technique and a hot press machine for performing the method. The method can be applied to plush fabrics made of synthetic fibers having a pile, such as velvet plush, Microplush™, plush velvet faux fur, micro mink knitted fabric, and other warp and circular knitted synthetic fabrics, single-ply or multi-ply and having a mass of at least approximately 120 GSM (Grams per Square Meter).

The method generally involves three phases: preparation of the fabric and the hot press machine, adjustment of the hot press machine, and patterning using the hot press machine.

Figure 1:
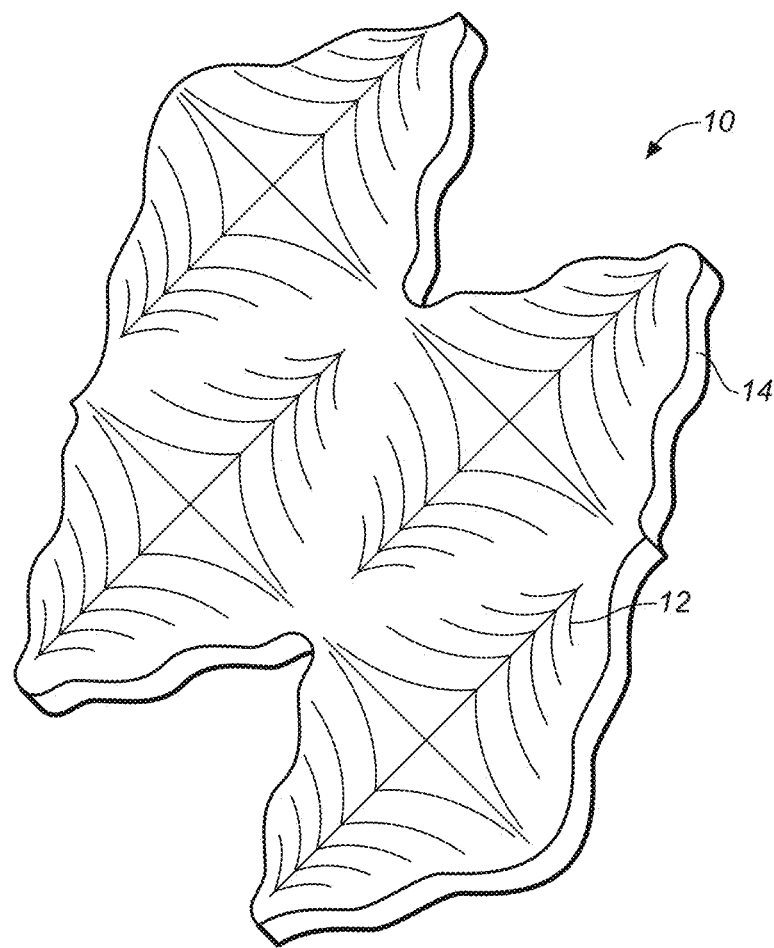
FIG. 1 is a top perspective view of a top plate having a raised relief pattern for use in the method of the invention.
Figure 2:
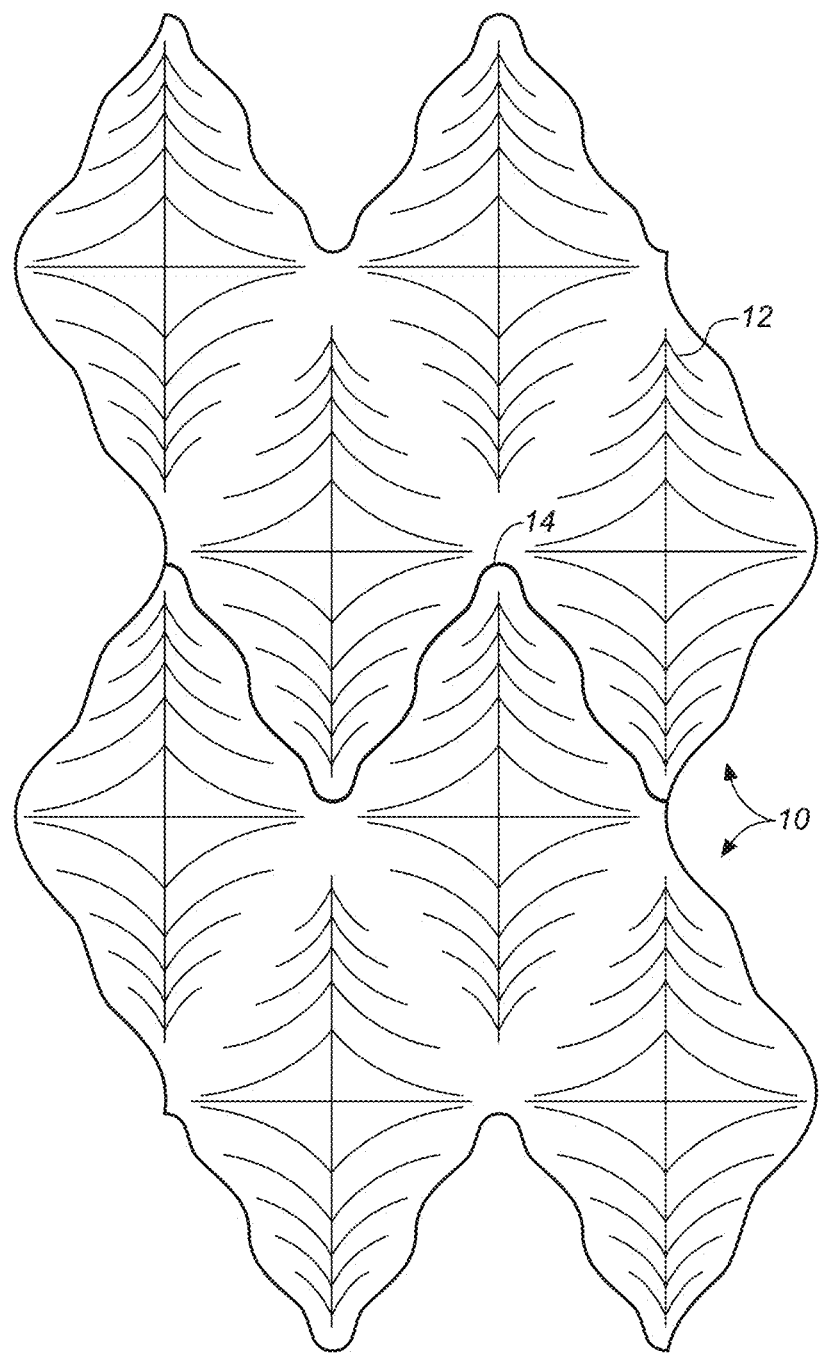
FIG. 2 is top plan view of two top plates of the type shown in FIG. 1 assembled together at the lateral edges thereof.
Figure 3:
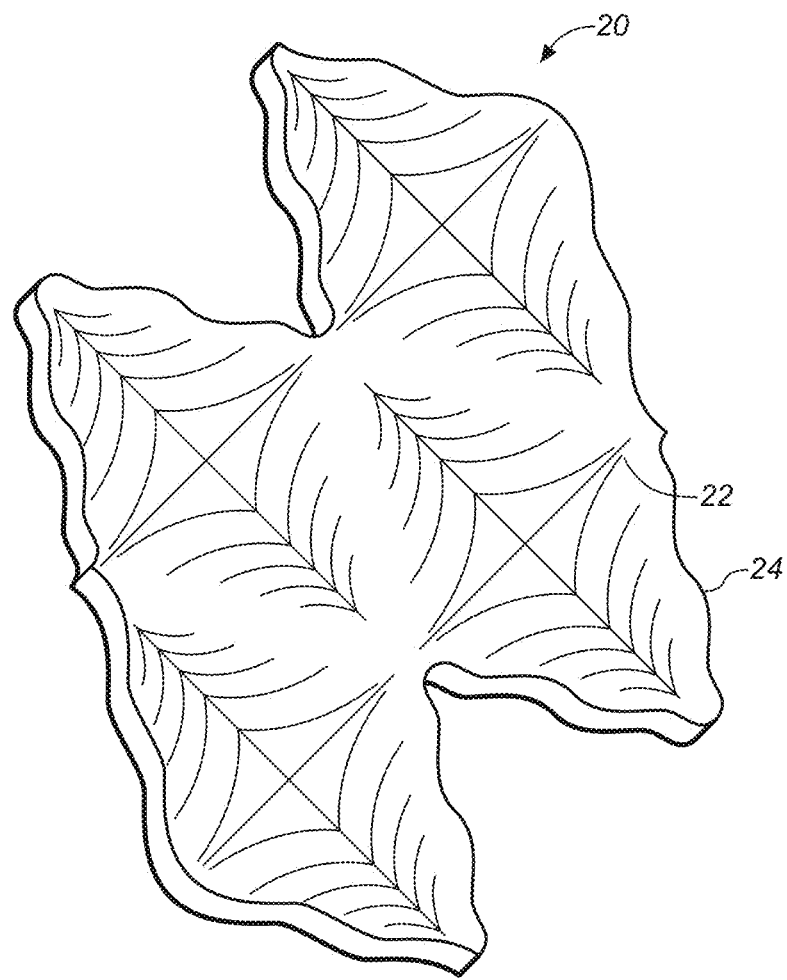
FIG. 3 is a top perspective view of a bottom plate having a recessed relief pattern for use in the method of the invention.
Figure 4:
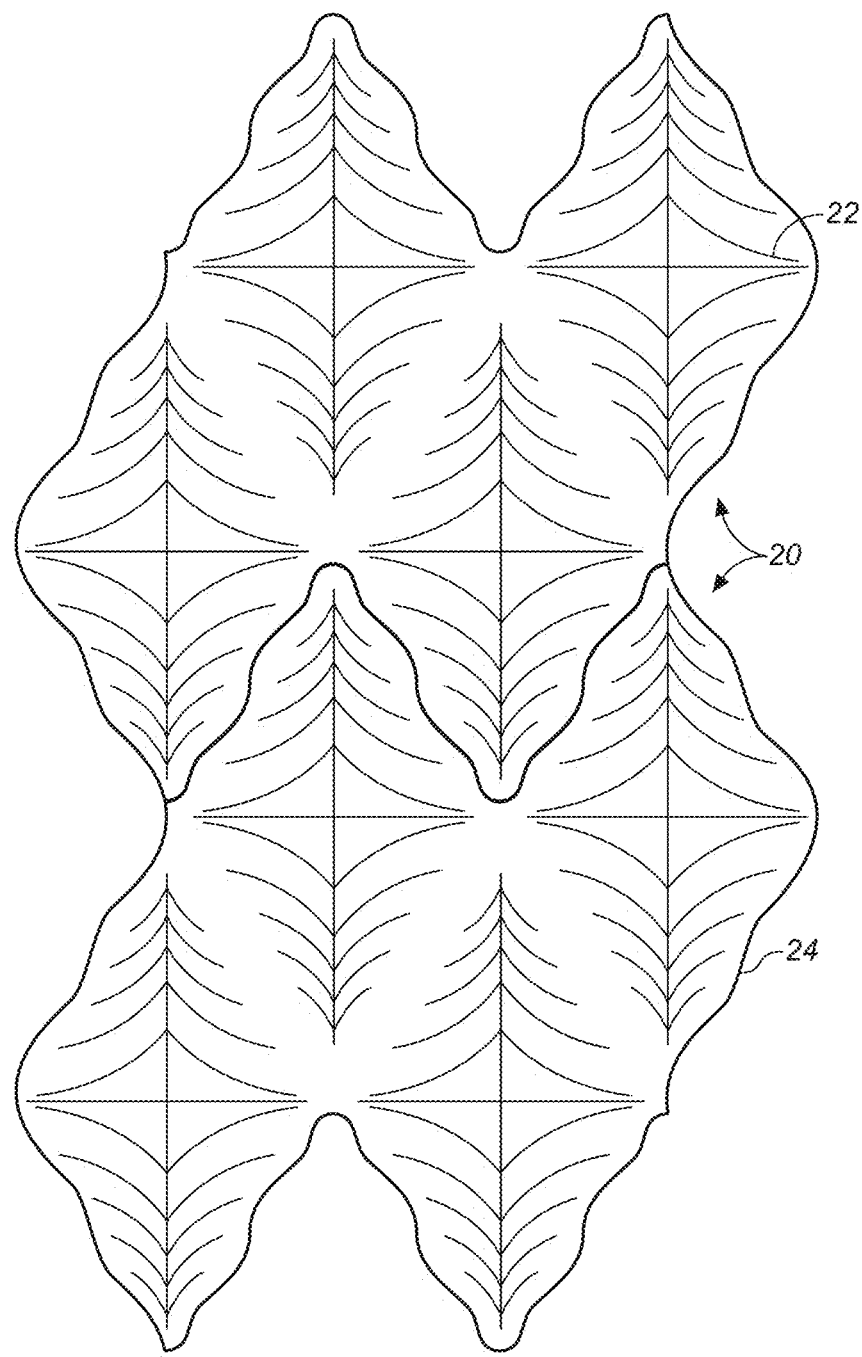
FIG. 4 is top plan view of two bottom plates of the type shown in FIG. 3 assembled together at the lateral edges thereof.
Figure 5A:
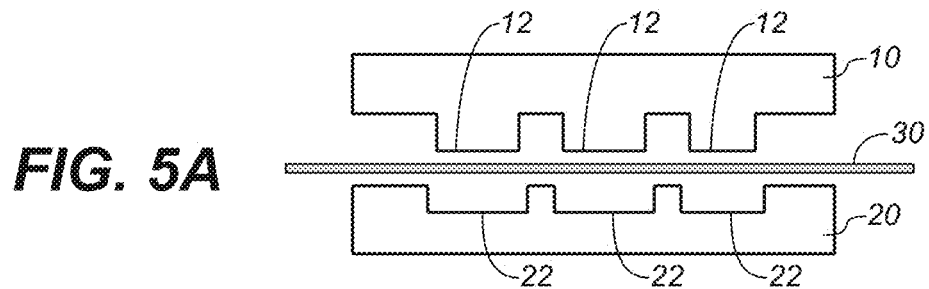
FIG. 5A is a side cross-sectional view of a portion of a top plate and bottom plate with a plush synthetic fabric disposed therebetween.
Figure 5B:
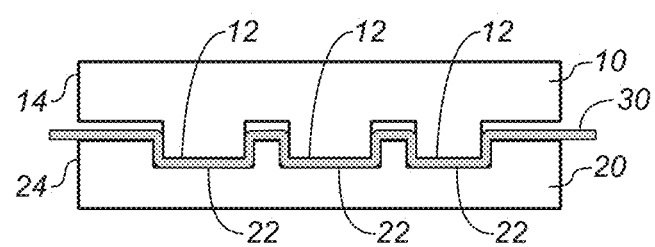
FIG. 5B is another side cross-sectional view thereof showing the top plate and the bottom plate pressed together on opposite sides of the fabric.

The hot press machine for the method includes one or more top plates 10, as illustrated in FIGS. 1 and 2, and one or more bottom plates 20, as illustrated in FIGS. 3 and 4. In the illustrated embodiment, each top plate 10 has a raised relief pattern 12 and each bottom plate 20 has a recessed pattern 22 configured to receive the raised relief pattern of one of the one or more top plates 10 (See also FIGS. 5A to 6B). In another embodiment, the bottom plates 20 have the raised relief pattern and the top plates 10 have the corresponding recessed pattern. In yet another embodiment, one of either the one or more top plates or the one or more bottom plates has the raised relief pattern and the other has a flat surface without any pattern. As described in detail below with respect to FIGS. 5A to 7, when the top plates 10 and the bottom plates 20 are heated and pressed together on opposite sides of a plush synthetic fabric 30 having a pile, they together impress a pattern 32 in the pile. As illustrated in FIGS. 2 and 4, two or more top plates 10 can be connected at lateral edges 14 and positioned in the hot press machine, along with two or more corresponding bottom plates 20 connected at lateral edges 24 in order to impress a larger, modular pattern on the fabric.

Preparation Phase

A selected roll of plush synthetic fabric 30 is unrolled, the ends of the roll are seamed together, and the fabric is evenly tensioned so that a pattern can be consistently applied across the material.

The hot press machine is then preheated to an initial temperature between 75° to 85° C., and usually approximately 80° C.

Next, the top plates and bottom plates are set in position in the hot press machine using high temperature glue, carefully checking for alignment of the raised and recessed patterns of the plates.

As shown in FIGS. 5A to 6B, when the plates are properly positioned and pressed together, the raised relief pattern 12 of the top plate 10 registers with and is received within the recessed pattern 22 of the bottom plate 20. When a plush synthetic fabric 30 is pressed between the top and bottom plates, the fabric 30 is compressed between the relief 12 and recessed 22 patterns only, while the difference between the top plate relief height H and the bottom plate recess depth D is large enough such that the pile of the fabric 30 is not firmly compressed between the portions of the plates outside the relief and recessed patterns. Suitable top plate relief height H and bottom plate recess depth D are thus dictated by the type of fabric used, including the pile height of the selected fabric.

Figure 6A:
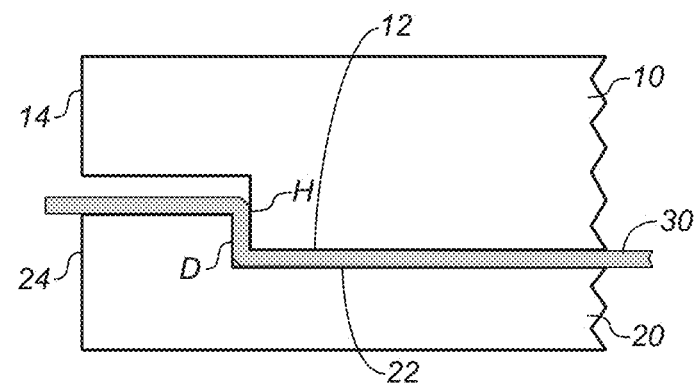
FIG. 6A is a close-up, side cross-sectional view thereof showing the interface of the lateral edges of the top and bottom plates when pressed together.
Figure 6B:
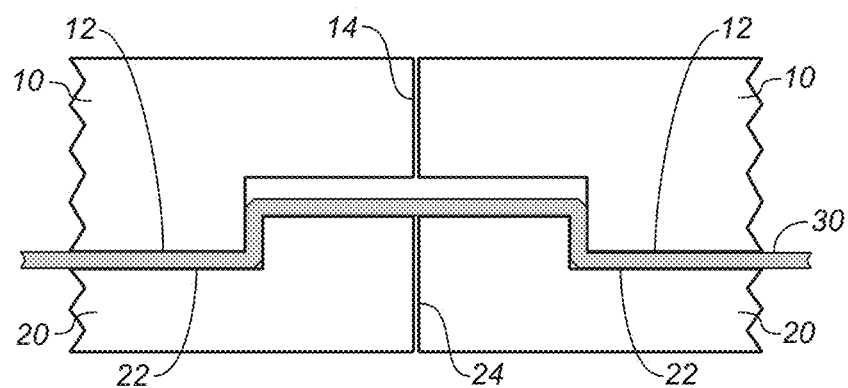
FIG. 6B is another close-up side cross-sectional view thereof showing the interface of the lateral edges of two top plates and two bottom plates with a plush synthetic fabric disposed therebetween.

In embodiments of the method in which two or more top plates and two or more bottom plates are used, the patterns do not intersect the lateral edges of the plates. This is to avoid the patterns being cut off at the edges of the plates. As shown in FIG. 6B, with patterns 12, 22 spaced inwardly from the lateral edges 14, 24, the plush synthetic fabric is not firmly compressed near the lateral edges. This avoids creating undesirable connecting marks at the adjoining lateral edges 14, 24 of the hot plates on the finished product.

Adjustment Phase

Next, the temperature of the top and bottom plates of the hot press machine is raised to at least 180° C. In one embodiment the temperature of the top and bottom plates is raised to approximately between 218° C. and 222° C. (usually approximately 220° C.). Once the plates reach the desired temperature, the plates are retained at that temperature for at least 10 minutes before further adjusting the fabric feeding parameters of the hot press machine.

The fabric feeding distance of the hot press machine is then set according to the width of the pattern plates and the machine is set for manual press in order to adjust the fabric feeding distance and automatic feeding speed. The fabric is then fed into the hot press machine with the pile facing the plate having the raised relief pattern. The plates are then pressed together two or more times to enable the vertical plate alignment to be checked and to adjust the press depth as needed to achieve consistent application of pressure across the fabric. The horizontal alignment of the plates is also checked in order to avoid inconsistencies across the pattern in the fabric due to any pattern mismatch.

Production

After the hot press machine has been adjusted for the pattern and fabric, the production phase begins by feeding fabric into the machine. The feeding speed is usually 0.66 to 1.25 feet per second, depending on the pattern and the particular fabric. The temperature of the hot press machine is maintained at least at 180° C. and approximately at 220° C., and proper alignment of the plates is regularly checked. Plate pressure is set for approximately 0.3 MPa (megapascals). The fabric feeding is repeatedly paused, the plates pressed together and the fabric feeding resumed in order to repeatedly print the relief pattern onto the feed of fabric.

The length of time during which the plates are pressed against the fabric during each pressing is set to at least 3 seconds and generally 7-10 seconds, but varies according to the fabric type, the pile height of the fabric, the fabric density and the particular pattern being impressed. Thicker piles generally require longer pressing times.

Figure 7:
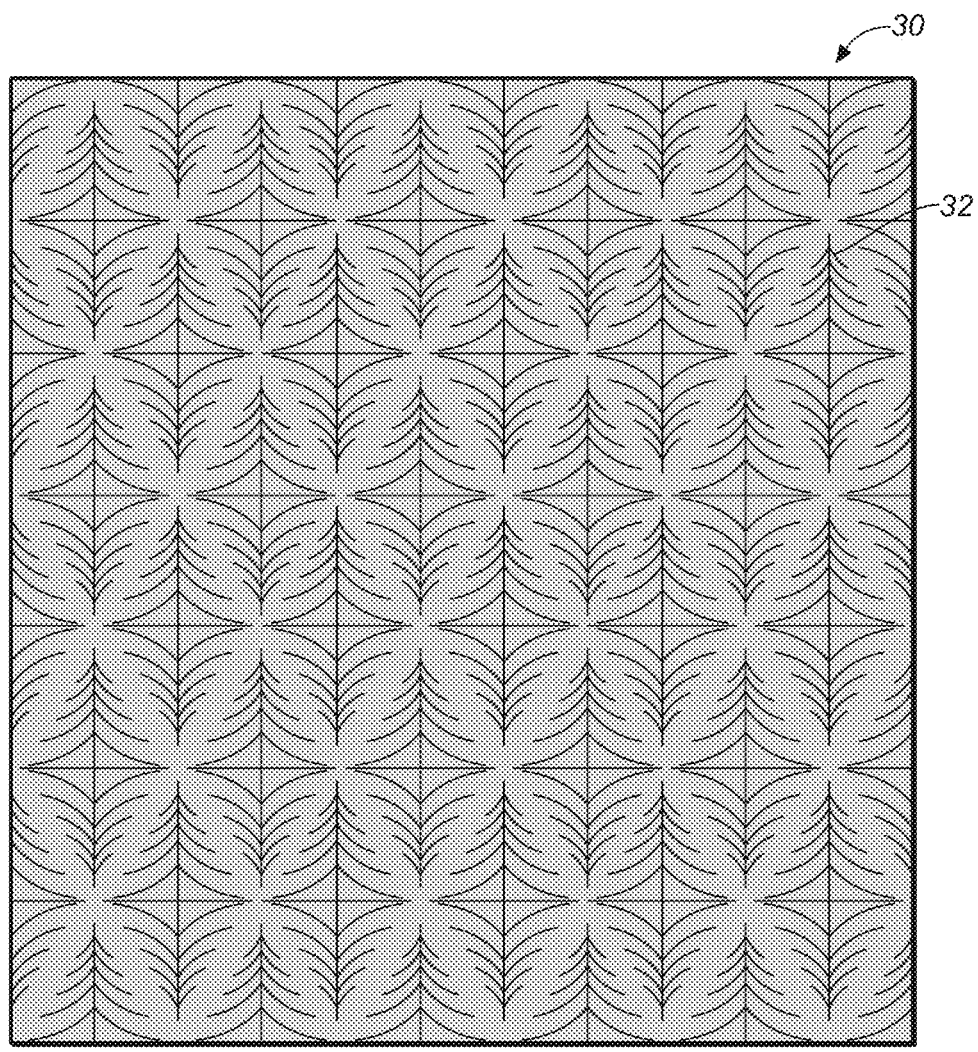
FIG. 7 shows a plush synthetic fabric with a pattern applied thereon in accordance with the method of the invention.

FIG. 7 illustrates a plush synthetic fabric patterned using the method of the invention.

The method described above has a distinct advantage over the prior art in that it enables creation of a permanently embossed pattern in a plush synthetic fabric with relative ease and at reduced expense. An added advantage to the method is that no cleanup of pattern edges on the fabric is needed after impressing the pattern.

There have thus been described and illustrated certain embodiments of a method for patterning a plush synthetic fabric using a hot press technique according to the invention. Although the present invention has been described and illustrated in detail, it should be clearly understood that the disclosure is illustrative only and is not to be taken as limiting, the spirit and scope of the invention being limited only by the terms of the appended claims and their legal equivalents.

I claim:

1. A method for applying a pattern to a plush synthetic fabric using a hot press technique, the method comprising:
    mounting one or more top plates and one or more bottom plates onto a hot press machine, at least one of the top or bottom hot plates comprising a raised relief pattern for imprinting onto a fabric,
    setting the temperature of the top and bottom plates to at least 180° C., and
    pressing the top and bottom plates together against opposite sides of a plush synthetic fabric having a pile on at least one side of the fabric, the raised relief pattern engaging the at least one side of the fabric having the pile such that the pattern is imprinted into the pile.

2. The method of claim 1, further comprising:
preparing the fabric before the pressing step by:
    unrolling a roll of fabric,
    seaming the ends of the unrolled fabric together, and
    tensioning the fabric evenly so that the pattern can be consistently applied across the fabric during the pressing step.

3. The method of claim 1, further comprising:
    preheating the top and bottom plates to between 75 and 85° C. before mounting the top and bottom plates onto the hot press machine.

4. The method of claim 1, the step of pressing the top and bottom plates together further comprising:
    pressing the top and bottom plates together for at least 3 seconds at a pressure of approximately 0.3 megapascals.

5. The method of claim 1, further comprising:
a printing cycle comprising:
    feeding the fabric into the hot press machine at a speed of 0.66 to 1.25 feet per second,
    pausing the feeding of the fabric, and
    pressing the top and bottom plates together against opposite sides of the fabric, the raised relief pattern engaging the at least one side of the fabric having the pile such that the pattern is imprinted into the pile; and
repeating the printing cycle.

6. The method of claim 5, the pressing step of the printing cycle further comprising:
    pressing the top and bottom plates together for at least 3 seconds at a pressure of approximately 0.3 megapascals.

7. The method of claim 1, at least one other of the top and bottom plates comprising a recessed pattern configured to receive the raised relief pattern.

8. The method of claim 7, the mounting step further comprising:
    aligning the raised relief pattern opposite the recessed pattern such that the recessed pattern registers with and receives the raised relief pattern when the top and bottom plates are pressed together.

9. The method of claim 7, the raised relief pattern having a relief height and the recessed pattern having a recess depth, the difference between the relief height and recess depth being large enough that during the step of pressing the top and bottom plates together the fabric is compressed between the relief and recessed patterns only and is not firmly compressed by portions of the plates that are not part of the relief and recessed patterns.

10. The method of claim 1, the plush synthetic fabric selected from the group consisting of velvet plush, plush velvet faux fur, micro mink knitted fabric, warp knitted synthetic fabric and circular knitted synthetic fabric.

11. The method of claim 1, the step of pressing the top and bottom plates together further comprising:
pressing the top and bottom plates together for at least 3 seconds and at a pressure of approximately 0.3 megapascals.

12. A method for applying a pattern to a plush synthetic fabric using a hot press technique, the method comprising:
mounting one or more top plates and one or more bottom plates onto a hot press machine, at least one of the top or bottom plates having a raised relief pattern for imprinting onto a fabric and at least one other of the top or bottom plates having a recessed pattern configured to receive the raised relief pattern,
setting the temperature of the top and bottom plates to at least 180° C.,
pressing the top and bottom plates together against opposite sides of a plush synthetic fabric having a pile on at least one side of the fabric, the raised relief pattern engaging the side of the fabric having the pile such that the pattern is imprinted into the pile.

13. The method of claim 12, the mounting step further comprising:
aligning the raised relief pattern opposite the recessed pattern such that the recessed pattern registers with and receives the raised relief pattern when the top and bottom plates are pressed together.

14. The method of claim 13, further comprising:
a printing cycle comprising:
feeding the fabric into the hot press machine at a speed of 0.66 to 1.25 feet per second,
pausing the feeding of the fabric, and
pressing the top and bottom plates together against opposite sides of the fabric, the raised relief pattern engaging the pile such that the pattern is imprinted into the pile; and
repeating the printing cycle.

* * * * *